Feb. 8, 1927.
A. E. COLEMAN
1,617,198
GRADOMETER
Filed Feb. 21, 1924
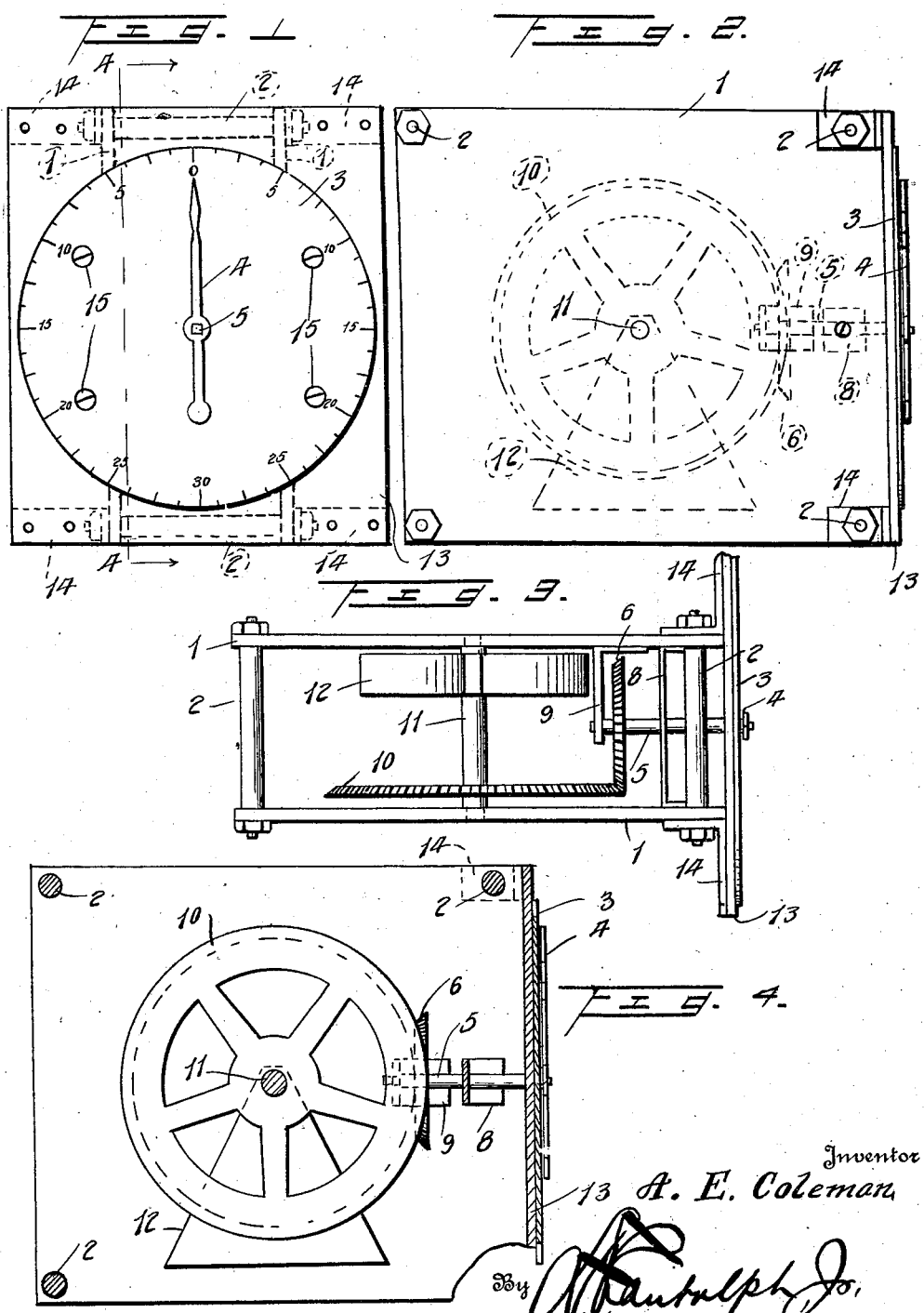
Inventor
A. E. Coleman
By [signature]
Attorney Patented Feb. 8, 1927.

1,617,198

UNITED STATES PATENT OFFICE.

ARTHUR E. COLEMAN, OF DANBY, VERMONT.

GRADOMETER.

Application filed February 21, 1924. Serial No. 694,366.

The object of the present invention is the provision of an instrument to be mounted upon a motor vehicle for indicating the grade of roads and surfaces over which the vehicle may travel.

One of the principal objects of the invention is the provision of an instrument of the nature aforesaid which may be readily applied to a vehicle and which is positive in action, automatic in operation and effective for the purpose designed and which will designate at all times the grade of the road or surface whether up or down.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a front view of a gradometer embodying the invention,

Figure 2 is a side view thereof,

Figure 3 is a top plan view, and

Figure 4 a sectional view on the line 4—4 of Figure 1.

Corresponding and like parts are referred to in the following description and designated in the several views of the drawings by like reference characters.

The instrument embodies a suitable frame which in the present instance includes spaced plates 1 and tie bolts 2, the ends of the latter being reduced and threaded and serving to maintain the plates 1 in determinate spaced relation. A dial 3 is attached to the frame and a pointer or hand 4 is provided to move thereover and in conjunction with graduations indicate the grade. The pointer is attached to the outer end of a shaft 5 to which is secured a pinion 6, said shaft being mounted in brackets 8 and 9 suitably attached to the frame. A gear wheel 10 fast to a shaft 11 is in mesh with a pinion 6 and a weighted arm 12 attached to the shaft 11 normally maintains a vertical position, and as a result any change in the surface of the road from the horizontal causes a corresponding change in the position of the vehicle and as a result a relative rotary movement of the gear elements 10 and 6 is produced and this change is indicated by the pointer 4 on the dial 3, in a manner well understood in instruments of the nature of the present invention.

A plate 13 is disposed between the dial 3 and the main frame and is attached to brackets 14 which are mounted upon the ends of the front tie bolts 2 exterior to the side plates 1. The dial 3 is attached to the plate 13 by machine screws 15 or analogous fastening means.

What is claimed is:

A gradometer having side members, a shaft spanning said side members, a relatively large gear wheel on said shaft parallel with the side members, a weight on said shaft, a gear wheel smaller than and meshing with the first mentioned gear wheel disposed transversely between and with respect to said members, a shaft for the smaller gear wheel parallel to said side members, brackets for said shaft secured to one of said side members, fastening elements spanning said side members, angle brackets outwardly of the side members and fastened thereto by said fastening elements, a plate transverse to and located at one end of the side members positioned by said angle brackets, a dial carried by said plate, the second mentioned shaft extending through said plate and dial and between said fastening elements, and a pointer on the second mentioned shaft coacting with said dial.

In testimony whereof I affix my signature.

ARTHUR E. COLEMAN.